(12) United States Patent
Mauro (10) Patent No.: US 11,827,334 B2
(45) Date of Patent: Nov. 28, 2023

(54) WINDOW FRAME FOR A VEHICLE AND METHOD OF MANUFACTURING A WINDOW FRAME

(71) Applicant: Premium Aerotec GmbH, Augsburg (DE)

(72) Inventor: Pasquale Mauro, Augsburg (DE)

(73) Assignee: Premium Aerotec GmbH

( * ) Notice: Subject to any disclaimer, the term of this patent is extended or adjusted under 35 U.S.C. 154(b) by 90 days.

(21) Appl. No.: 17/489,954

(22) Filed: Sep. 30, 2021

(65) Prior Publication Data
US 2022/0097819 A1    Mar. 31, 2022

(30) Foreign Application Priority Data

Sep. 30, 2020    (DE) .......................... 102020125610.8

(51) Int. Cl.
*B64C 1/14*    (2006.01)

(52) U.S. Cl.
CPC .................................. *B64C 1/1492* (2013.01)

(58) Field of Classification Search
CPC .............................. B64C 1/1492; B60J 1/006
See application file for complete search history.

(56) References Cited

U.S. PATENT DOCUMENTS 4,823,229 A * 4/1989 Waterland, III ...... B64C 1/1476
174/358
5,271,581 A * 12/1993 Irish ...................... B64C 1/1492
52/208
10,337,236 B2    7/2019 Yokoi
2008/0078876 A1 * 4/2008 Baggette ............... B29C 70/446
244/129.3

(Continued)

FOREIGN PATENT DOCUMENTS

DE    102017128343 A1    5/2019
EP    3199448 A1    8/2017

(Continued)

OTHER PUBLICATIONS

Extended European Search Report for Application No. 21200263.8 dated Feb. 16, 2022, 4 pages. [See p. 2, categorizing the cited references].

*Primary Examiner* — Christopher D Hutchens
(74) *Attorney, Agent, or Firm* — Lerner David LLP (57) ABSTRACT

A vehicle window frame includes a stiffening frame component and an inner retaining frame component adapted to be coupled to the stiffening frame component for receiving at least a portion of a window. The stiffening frame component includes a profile having a support portion and an inner flange extending perpendicularly thereto and forming an inner edge of the stiffening frame component. The support portion forms a support surface extending radially outwardly from the inner edge for support against an edge surface of a window opening. The inner retaining frame component includes a profile having a coupling portion adapted to be fitted onto the inner flange and a connecting portion. forming an edge surface of the retaining frame component for overlapping the edge surface and having at a radially inner boundary thereof a projection facing away from the coupling portion and the support portion for wrapping around the window opening.

14 Claims, 7 Drawing Sheets

(56) References Cited

U.S. PATENT DOCUMENTS

2008/0217479 A1* 9/2008 Wood ................... E06B 3/5481
　　　　　　　　　　　　　　　　　　　　　　　 403/345
2015/0060603 A1* 3/2015 Yokoi ...................... E06B 5/18
　　　　　　　　　　　　　　　　　　　　　　　　 49/463

FOREIGN PATENT DOCUMENTS

GB　　　　　498077 A　*　1/1939
WO　　　2005115841 A1　12/2005

* cited by examiner

(PRIOR ART)

WINDOW FRAME FOR A VEHICLE AND METHOD OF MANUFACTURING A WINDOW FRAME

FIELD OF THE INVENTION

The invention relates to a window frame for a vehicle and a method of manufacturing a window frame.

BACKGROUND OF THE INVENTION

Vehicles for transporting passengers typically have a vehicle body with a passenger cabin formed therein, the vehicle body usually having windows through which passengers can look outwardly. Since arranging a window in a vehicle body involves making a window opening, measures for stiffening an edge portion of the window opening in question are desired. For this purpose, the window frames are often mechanically adapted accordingly so that they are capable of absorbing the loads occurring in the edge region of the window opening during operation of the vehicle.

Window frames with an arrangement of flanges at an angle to one another have become established in aircraft. For example, window frames are known which have a T-shaped profile cross-section and completely surround the relevant window opening. An arrangement of a plurality of windowpanes with a sealing profile holding the windowpanes may be accommodated on an inner side of the window frame. However, particularly in the case of aircraft having a fuselage made of a fiber composite material, edge regions of individual window openings may have material thicknesses which differ from the edge regions of other window openings of the same fuselage. In order to adapt to these different material thicknesses, window frames are always required which are individually adapted to a particular material thickness and which are inserted into the window openings. This is necessary since all window frames result in a predetermined geometrical arrangement on the outside of the window opening, and continuous reference lines are desired on the inside of the fuselage for attachment. This is particularly challenging for window frames made of a fiber composite material, as several different molds must be made to fabricate the individual window frames. In addition, the resulting variety of parts is very high.

BRIEF SUMMARY OF THE INVENTION

An aspect of the invention proposes a window frame for a vehicle, which can be adapted particularly well and with a small amount of effort to a material thickness of an edge region of a window opening without forcing a large number of different tools and an overall high diversity of parts.

A window frame for a vehicle is proposed comprising a stiffening frame component and an inner retaining frame component coupleable to the stiffening frame component for receiving at least a portion of a window, the stiffening frame component having a profile with a support portion and an inner flange extending perpendicular thereto, the inner flange forming an inner edge of the stiffening frame component and the support portion forming a support surface extending radially outwardly from the inner edge for support against an edge surface of a window opening, wherein said inner retaining frame component comprises a profile having a coupling portion and a connecting portion, said coupling portion being adapted to be fitted onto said inner flange of said stiffening frame component, and said connecting portion forming a surface for overlapping said edge surface of said window opening and having, at a radially inner boundary thereof, a projection facing away from said coupling portion and said support portion for wrapping around said window opening on a radially inner side thereof.

Consequently, the window frame according to an embodiment of the invention has two essential components which, when combined, provide a customized window frame. The stiffening frame component is primarily provided for the function of stiffening. For this purpose, the inner flange and the support portion are arranged at an angle to each other in order to generate corresponding surface moments of inertia in one or more directions. In particular, the inner flange can be arranged at right angles to the support portion.

On a side facing away from the inner flange, the support portion preferably has a straight edge which is suitable for flush placement on the edge surface of the window opening. The straight edges formed in all profile cross-sections rest in each case on a corresponding, radially extending surface line of the edge surface.

The inner flange and the support portion may include a transition region to each other, which is preferably rounded. In particular, when a fiber-reinforced material is used, the force flow in the fibers may be harmonious and without jumps. The ends of the inner flange and the support portion may also be rounded or rounded.

The coupling portion of the inner retaining frame component serves to connect it to the stiffening frame component. For this purpose, both components are designed complementary to each other. For example, the coupling portion may comprise an indentation or a recess into which the inner flange may be inserted. The particularity of the window frame according to the invention lies in particular in forming a usually one-piece T-shaped profile by means of the two individual components, wherein an easy adaptability of the shape of the window frame is achievable by using the connection, which may be form-fitting. The inner flange may be manufactured with different lengths, so that the height of the profile cross-section varies hereby, which allows an individual adaptability to different material thicknesses in the area of the window opening. The connection may be limited to a loose, non-clamping reception of the inner retaining frame component by the stiffening frame component.

The stiffening frame component and the inner retaining frame component may further be positively and/or materially bonded to each other in an assembled form, if desired. In particular, bonding or welding methods may be considered for this purpose. Using a sealant between the two components may likewise cause such a connection. It is conceivable to provide the inner flange identically on all stiffening frame components and to adjust it individually before assembly, i.e. to shorten it. Once the inner flange has been individually adapted, it may be arranged on the inner stiffening frame and connected thereto by a suitable connection method. Thus, despite the manufacture of only a plurality of similar components, the desired plurality of different window frames can be provided by simply adapting the inner flanges.

In an advantageous embodiment, the coupling portion comprises a recess, wherein a profile of the inner flange comprises at least one outwardly extending rectilinear portion that is insertable into the recess. Accordingly, the inner flange can adapt the window frame to the desired configuration by trimming to a desired dimension. Since the outboard portion is rectilinear, it will always fit into the recess after trimming if there is still a sufficient length of the rectilinear portion remaining.

Particularly preferably, the recess is formed as an intermediate space between two sections of a flanged edge of the inner retaining frame component which extend parallel to each other. In this case, the edge is bent outwards so that it projects over the inner flange and slightly over the support portion. Thus, a flanging is formed in which two portions of the edge bent through 180° are then parallel to each other. This defines an intermediate space which may accommodate the inner flange. Preferably, the intermediate space is formed such that the inner flange comes into abutment with its end edge with an inner edge of the flanging. Subsequently, a material-locking connection of the two components can be carried out.

The recess may have an open end and a closed end, the open end comprising a rounded cross-section. The rounded cross-section is achieved by curved shaping, for example by forming a fibre-reinforced plastic material or placing fibres on a curved shape with a specific bending radius. This allows a harmonic flow of forces and the fibers do not break.

As mentioned above, the inner flange can be cut to size for any window frame. The cutting may be achieved by milling, grinding or sawing. Alternatively, a tool for producing the stiffening frame component may also comprise two or more tool sections that may be variably positioned relative to one another and that allow the stiffening frame component to be shaped, for example by depositing fibre-reinforced plastic on a tool surface adapted by adapted relative positions of the two or more tool sections, with a variable length of the inner flange.

It is advantageous if the stiffening frame component has an L-shaped or J-shaped profile cross-section. Here, two substantially perpendicular legs of a profile cross-section of the stiffening frame component are provided, which provide a high stiffness at the edge surface of a window opening. The wall thickness of the stiffening frame component may be constant. The L-shape may have two rectilinear sections in the profile cross-section, one of the sections being associated with the inner flange and another section, the support portion, extending radially outwardly perpendicular thereto. In the J-shape, the radially outward end of the profile cross-section may have an arc extending from the support portion in a direction parallel to the inner flange. The arc may have a radius of curvature that may correspond to the radius of curvature between the support portion and the inner flange.

In an advantageous embodiment, a cavity facing away from the coupling portion is formed between the stiffening frame component and the inner retaining frame component. The shape of the stiffening frame component oriented towards the force flows has a rounded shape in the region of the support surface. When the inner retaining frame component adjoins the stiffening frame component, it does not completely fill a space from the curved portion of the stiffening frame component. As a result, a cavity is formed. This is not significant to the function of the window frame, but may instead result in weight savings.

The support portion of the stiffening frame component and the projection of the inner retaining frame component comprise an offset formed transversely of the support portion. Accordingly, with the window frame placed on an inner edge surface of the window opening, the projection extends further outward in a radial direction and at least partially overlaps an inner edge of the window opening. Sealing material may be placed in a gap between the projection and the inner edge of the window opening.

The window frame may further comprise an outer retaining frame component arranged on the inner retaining frame component and configured to press a window arranged on the inner retaining frame component onto the inner retaining frame component from a side opposite to the inner retaining frame component. The outer retaining frame component does not have to be arranged on the inner retaining frame component in a material bonding manner, but may be connected thereto via a screw-type engagement. For this purpose, several recesses may be arranged on the inner retaining frame component, through which bolts or other connecting means extend.

The stiffening frame component and the inner retaining frame component may be formed from a fiber reinforced plastic. The layered structure of the window frame may substantially correspond to that of a conventional vehicle component made of a fiber composite material. In this case, a plurality of layers of reinforcing fibers embedded in a matrix material are provided. The reinforcing fibers may be in the form of a textile structure, such as a plurality of individual fibers, a woven fabric, a knitted fabric, or the like. Reinforcing fibers may further comprise carbon fibers, glass fibers, or other tensile, fibrous materials. The reinforcing fibers may be arranged in layers of different directions. Reinforcing fibers may also be arranged in individual layers, which run in groups in different directions in the same layer. In this way, a very high strength can be achieved while maintaining a low weight. The structure according to the invention can also reduce the cost, since a large variety of tools is not required to produce a larger number of different window frames. It is particularly advantageous if the fiber-reinforced plastic is formed from the same plastic as the body of the vehicle.

Furthermore, the fiber-reinforced plastic may comprise a thermoplastic matrix. This could comprise, for example, polyetherketoneketone (PEKK), polyetheretherketone (PEEK), polyetherimide (PEI), polycarbonate (PC), polypropylene (PP) or others. Preferably, the window frame is adapted to the corresponding installation condition and an expected maximum load case like a conventional vehicle component. By using the thermoplastic matrix, forming processes can be used to produce the components described above from, for example, a sheet-like starting material.

In an advantageous embodiment, the window frame may further comprise at least one centering means attachable to the stiffening frame component and configured to align the inner retaining frame component with the stiffening frame component. The centering means may be realized in the form of a pin, which may be arranged on the stiffening frame component. For aligning the inner retaining frame component, it preferably comprises recesses adapted to the shape of the at least one centering means. The at least one centering means may comprise a shape feature, for example a pin, a pin-like extension or the like, which may be brought into surface contact with the recess of the inner retaining frame component.

In an advantageous embodiment, the at least one centering means is configured to align the outer retaining frame component with the stiffening frame component and/or the inner retaining frame component. For this purpose, the at least one centering means may comprise a receptacle, such as a thread, connectable to a screw means suitable for fixing the outer retaining frame component.

Further, the stiffening frame component may include at least one recess for receiving a shoulder of the at least one centering means. This allows the at least one centering means to be precisely aligned with the stiffening frame component. The shoulder and the recess are thereby adapted to each other.

The invention further relates to an aircraft comprising a fuselage having at least one window opening and at least one window frame according to the above description.

BRIEF DESCRIPTION OF THE DRAWINGS

Further features, advantages and possible applications of the present invention will be apparent from the following description of the embodiments and the figures. In this context, all the features described and/or illustrated constitute, in themselves and in any combination, the subject-matter of the invention, also irrespective of their composition in the individual claims or their references. Furthermore, in the figures, the same reference signs stand for the same or similar objects.

DETAILED DESCRIPTION

Figure 1:
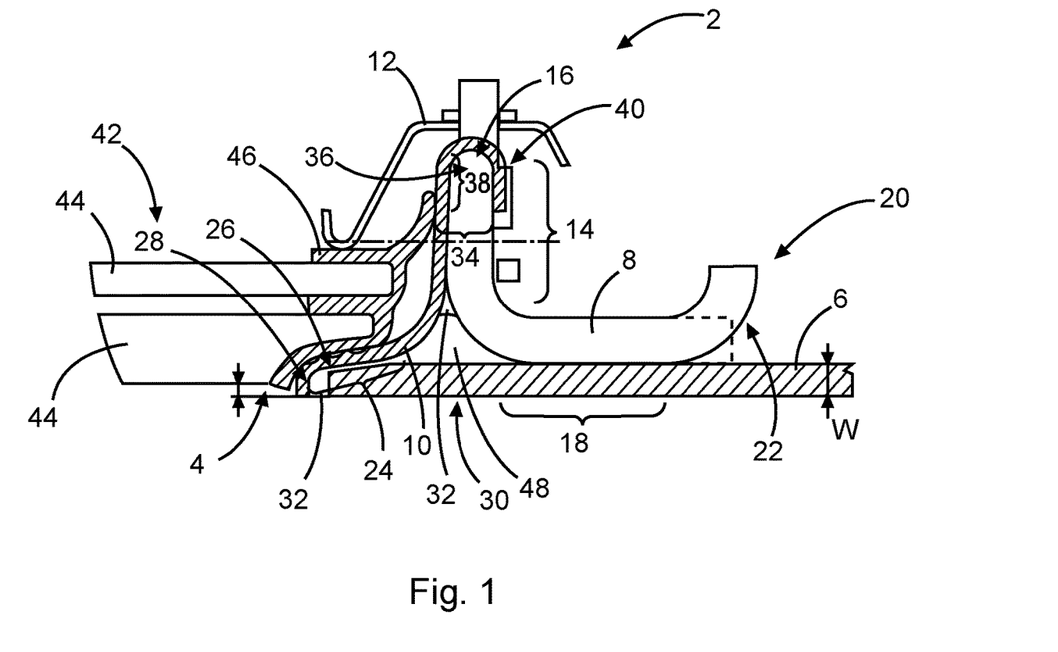
FIG. 1 shows a window frame in a sectional view.

FIG. 1 shows a window frame 2 in a sectional view, which is inserted into a window opening 4 of a vehicle body 6. In this case, the vehicle body 6 is an aircraft fuselage. The window frame 2 has a stiffening frame component 8, an inner retaining frame component 10 and an outer retaining frame component 12. The shown components 8, 10 and 12 may be made of a fiber reinforced plastic.

The stiffening frame component 8 has a J-shaped profile cross-section. An inner flange 14 extends locally transversely of the vehicle body 6 and has a rounded end edge 16. A support portion 18 extends radially outwardly from the inner flange 14 and, by way of example, is substantially perpendicular thereto. A radially outward end 20 of the stiffening frame component 8 may have an arc 22 extending from the support portion 18 in a direction parallel to the inner flange 14. This forms a J-shape. Alternatively, the stiffening frame component 8 may have a straight, blunt outer end 20, resulting in an L-shape. This is shown in dashed lines in FIG. 1 and in the further figures below.

The inner retaining frame component 10 has a connecting portion 24 that overlaps an edge surface 26 of the window opening 4. This creates an offset between the support portion 18 and a projection 28 of the inner retaining frame component 10 in a direction transverse to the support surface 18. This offset corresponds approximately to a wall thickness w of the vehicle body 6 in the region around the window opening 4, as the projection 28 extends substantially to an outer surface 30 of the vehicle body 6.

A sealing material 32 is disposed between the edge surface 26 of the window opening 4 and the projection 28 of the inner retaining frame component 10 or the connecting portion 24. This results in a material bond and a smooth outer surface of the aircraft fuselage 6 without vortex generating edges.

The inner retaining frame component 10 further comprises a coupling portion 34 configured to receive the inner flange 14 of the stiffening frame component 8. For this purpose, the coupling portion 34 comprises a recess 36, which is formed here as a space between two sections 38 of a flanged edge 40 of the inner retaining frame component 10 extending parallel to each other. The parallel arrangement of the sections 38 is useful because, by way of example, the inner flange 14 is formed with a constant wall thickness and is always insertable into the recess 36 by trimming to a desired height. This allows the window frame 2 to have different heights transverse to the support portion 18 without the need for dedicated, separate tooling for its manufacture.

A window 42 having windowpanes 44 and a window seal 46 rests on the connecting portion 24 of the inner retaining frame component 10 and is supported by the inner retaining frame component 10. The outer retaining frame component 12 presses on the window seal 46 and consequently clamps the window 42 between the inner retaining frame component 10 and the outer retaining frame component 12.

A cavity 48 is formed between the inner retaining frame component 10 and the outer support retaining frame component 12 in the region adjacent the fuselage 6. There, sealing compound 32 may also be introduced at an area facing away from the fuselage 6 where the inner retaining frame component 10 and the stiffening frame component 8 contact.

Figure 2A:
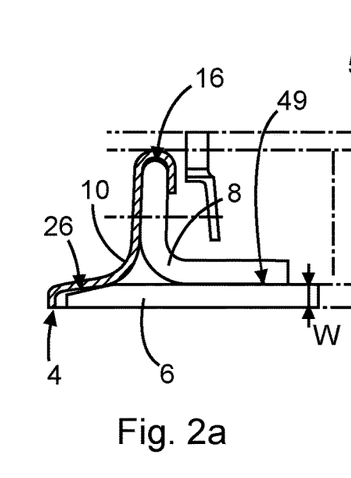
FIGS. 2a to 2c show the window frame from FIG. 1 in three different heights.
Figure 2B:
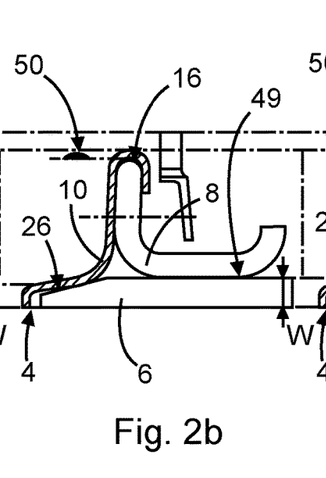
Figure 2C:
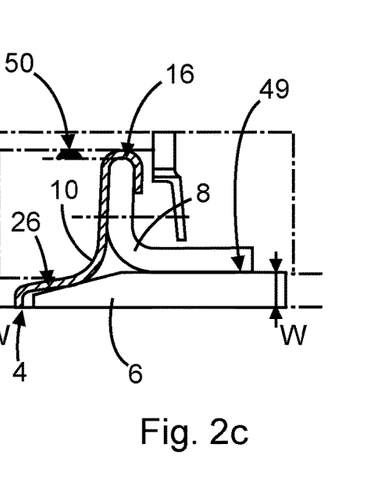

As FIGS. 2a to 2c show, the window frame 2 is adjustable in height above the vehicle fuselage 6 by trimming the inner flange 14. FIG. 2a shows the vehicle body 6 with a least wall thickness w. In FIG. 2b the wall thickness w is slightly greater, while in FIG. 2c the greatest wall thickness w is shown. Since the connecting section 24 is intended to overlap the edge surface 26 of the window openings 4, but on the inside of the vehicle body there is to be a non-stepped, continuous structure for the attachment of fixtures, adapted window frames 2 are necessary. These are generated, as shown in FIGS. 2a to 2c, by inner flanges 14 adapted thereto. The heights of the inner flanges 14 decrease in the course of FIGS. 2a to 2c and consequently lead to a constant extension into the interior of the fuselage as seen from an inner fuselage side 49. To achieve this, a certain amount of material 50 was removed from each of the inner flanges 14 in FIGS. 2b and 2c.

Figure 3:
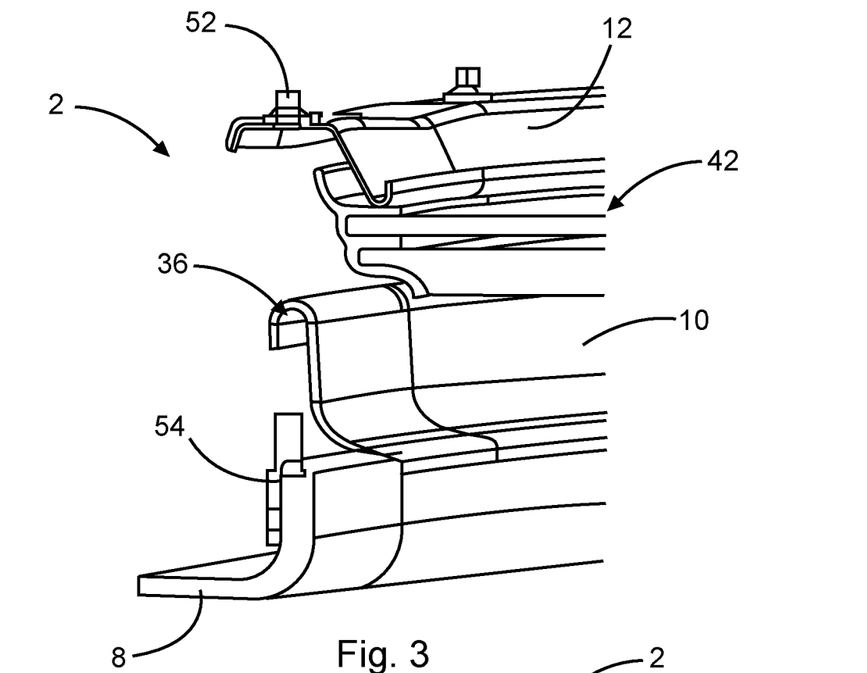
FIG. 3 shows a partial section of the window frame.

FIG. 3 shows a partial section of a three-dimensional representation of the window frame 2 with one of the windows 42. The outer retaining frame component 12 is aligned with and connected to the stiffening frame component 8 via screw means 52. For this purpose, the stiffening frame component 8 has corresponding centering means 54 to which screw means 52 are connectable.

Figure 4:
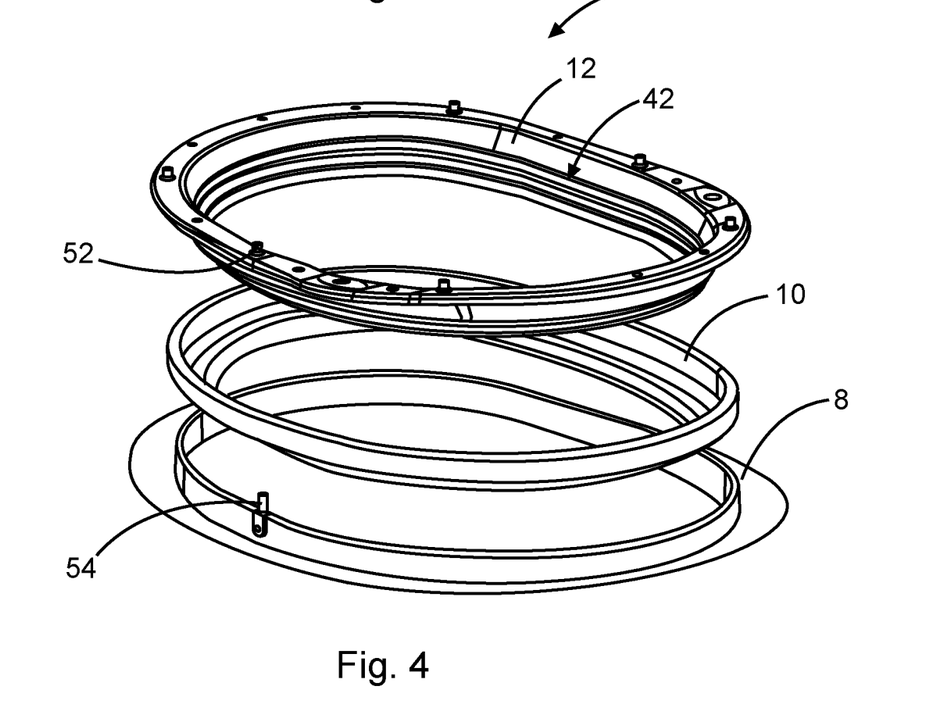
FIG. 4 shows an exploded view of the window frame together with the window.

FIG. 4 shows an exploded view of the window frame 2 together with the window 42. The components 8, 10 and 12 are designed to completely surround the corresponding window opening 4 and are preferably made in one piece.

Figure 5:
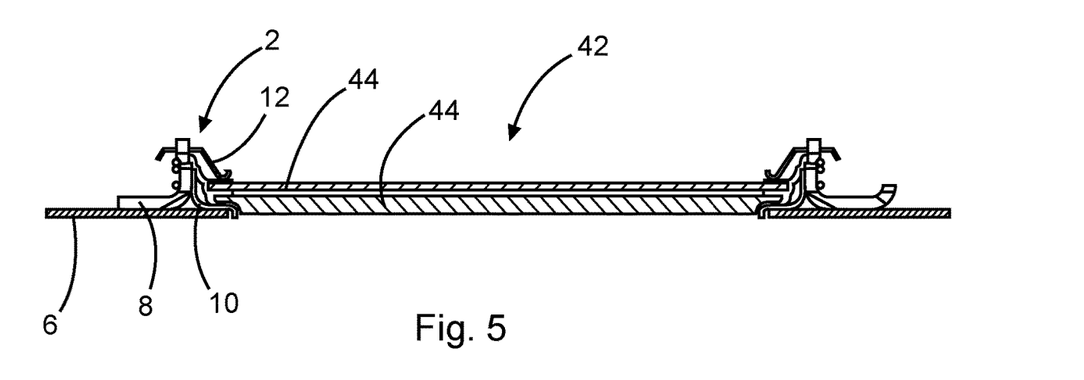
FIG. 5 shows the window frame in the installed state in a side section.

FIG. 5 shows the window frame 2 together with the window 42 in the installed state in a side section.

Figure 6:
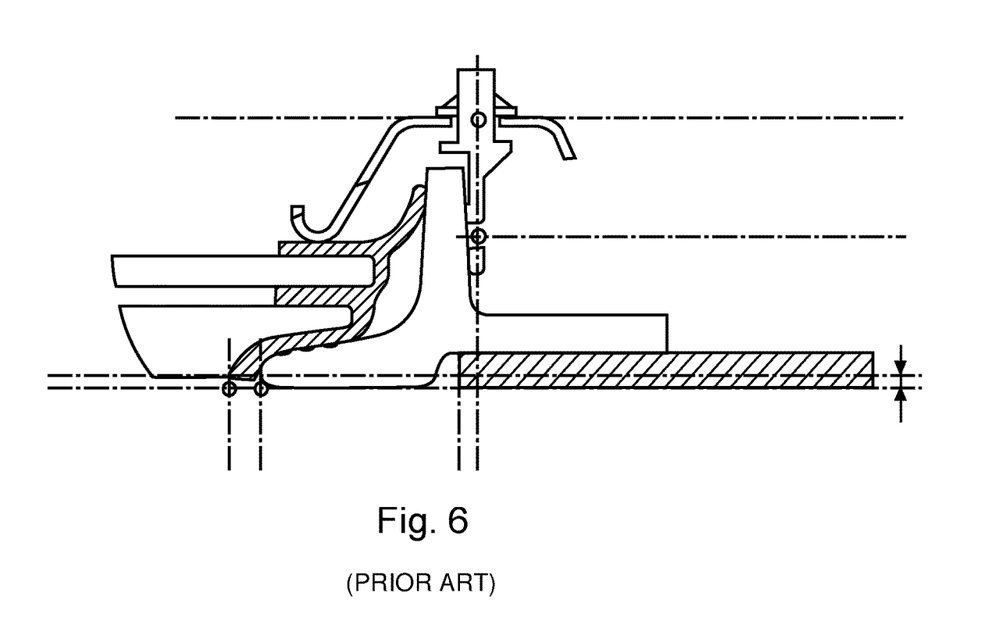
FIG. 6 shows a window frame according to the prior art.

FIG. 6 shows a conventional window frame 56 which has a T-shaped profile cross-section. Since this window frame 56 has an overall one-piece construction, entirely different window frames 56 are necessary for the realization with different wall thicknesses.

Figure 7A:
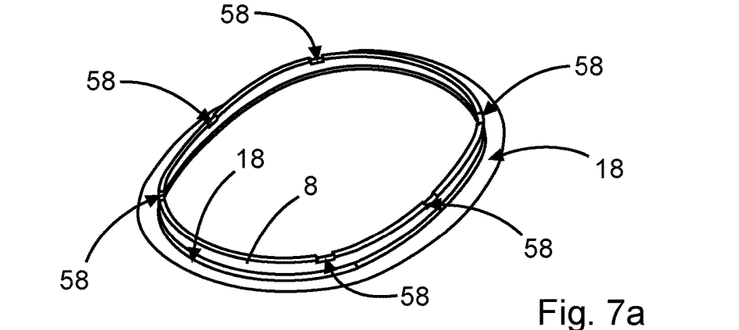
FIGS. 7a to 7c show the stiffening frame component, the inner retaining frame component and the assembled components in three views.

FIG. 7a shows the stiffening frame component 8 in a three-dimensional view. Here, recesses 58 can be seen into or onto which the centering means 54 are insertable.

Figure 7B:
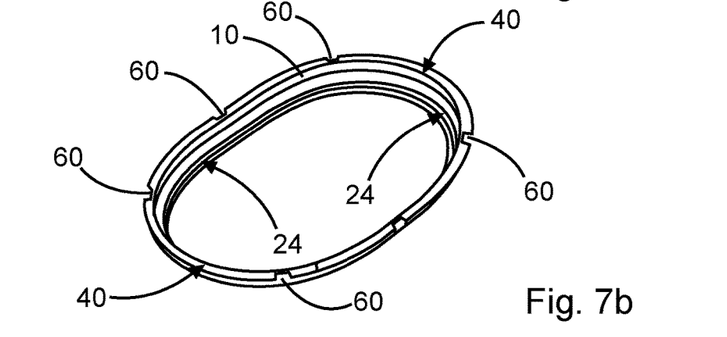

FIG. 7b shows the inner retaining frame component 10, which has corresponding recesses 60 through which the centering means 54 can extend. These are arranged in the edge 40.

Figure 7C:
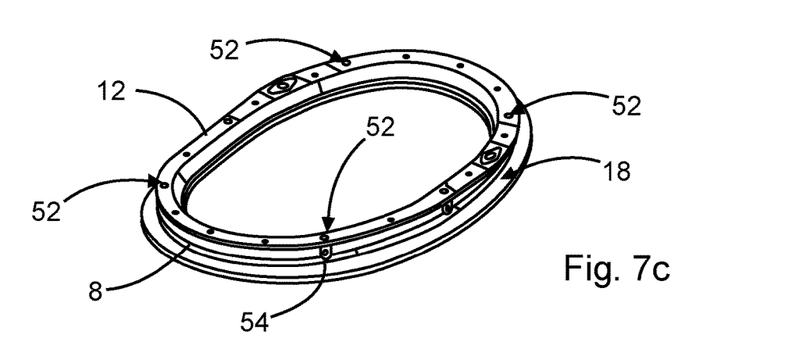

FIG. 7c shows the stiffening frame component 8 with the inner retaining frame component 10 in place, with the centering means 54 extending through the recesses 60 of the inner retaining frame component 10. The screw means 52 are screwed thereto, thereby retaining the outer retaining frame component 12 on the inner retaining frame component 10.

Figure 8:
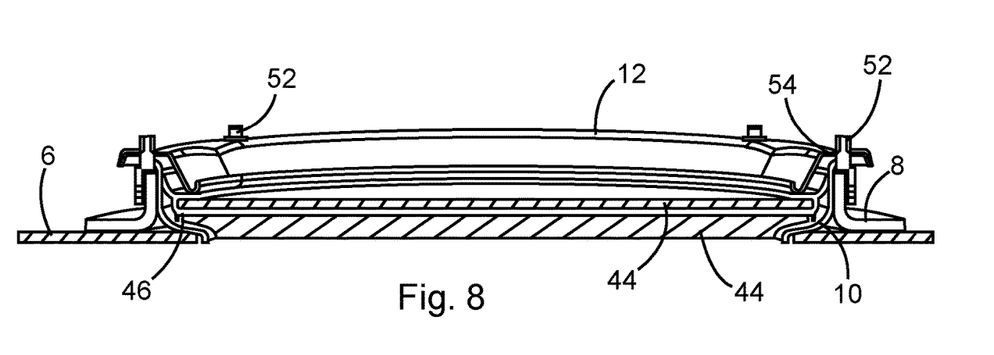
FIG. 8 shows the window frame in a three-dimensional sectional view.

FIG. 8 shows a sectional view of the window frame 2 as in FIG. 5, but in a slightly oblique view for improved understanding.

Figure 9A:
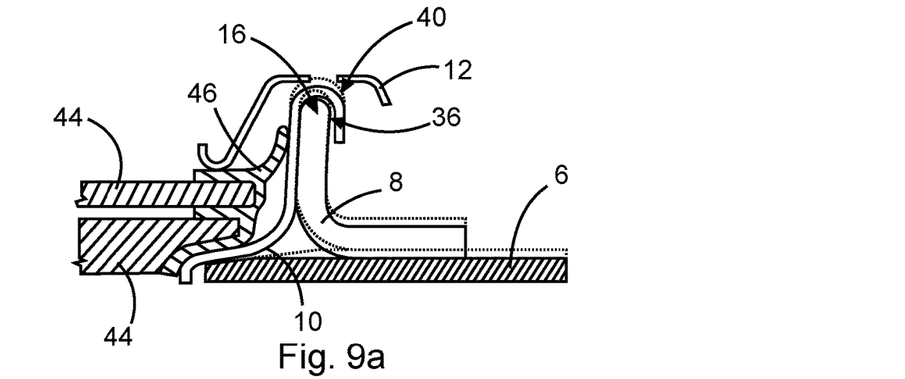
FIGS. 9a to 9d show details of the centering means in various sectional views.
Figure 9B:
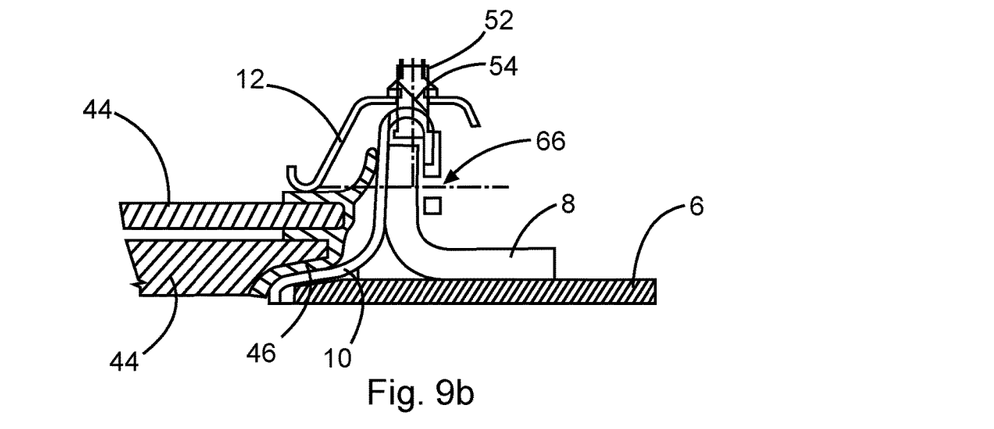

FIG. 9a shows a sectional view of an area of the window frame 2 in which no centering means 54 is positioned. Meanwhile, FIG. 9b shows an equivalent sectional view of an area of the window frame 2 in which centering means 54 is positioned.

Figures 9C, 9D:
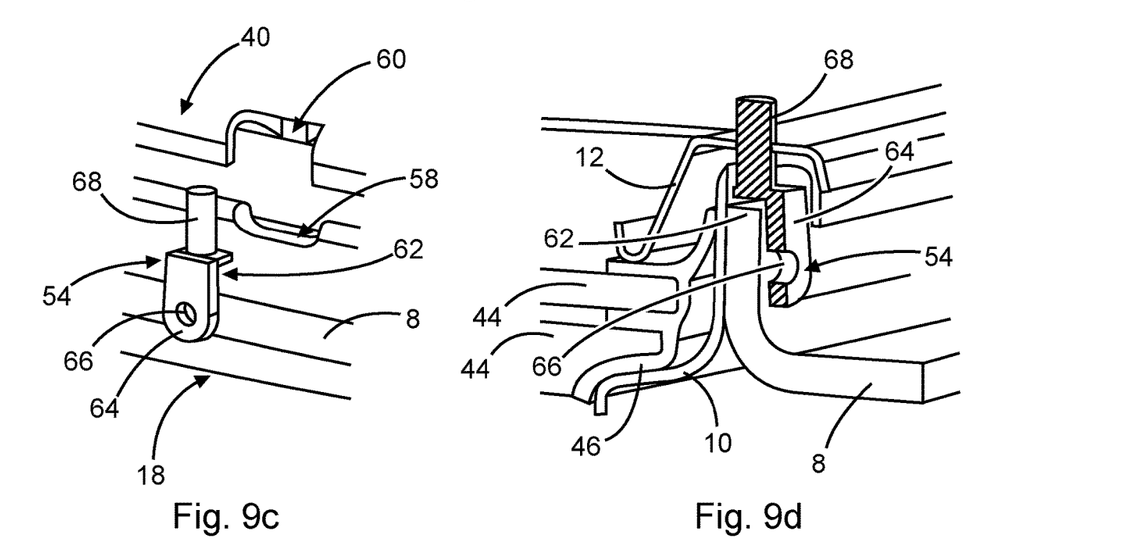

A first example embodiment of the centering means 54 shown therein is shown by way of example in FIGS. 9c and 9d. The centering means 54 has a shoulder 62 that can be placed on the recess 58. A tab 64 extends from the shoulder towards the support portion 18, the tab having a through hole 66 for securing the centering means 54, for example by a locking screw (not shown). An elongate receiving thread 68 extends in an opposite direction and is configured to receive the screw means 52.

Figure 10A:
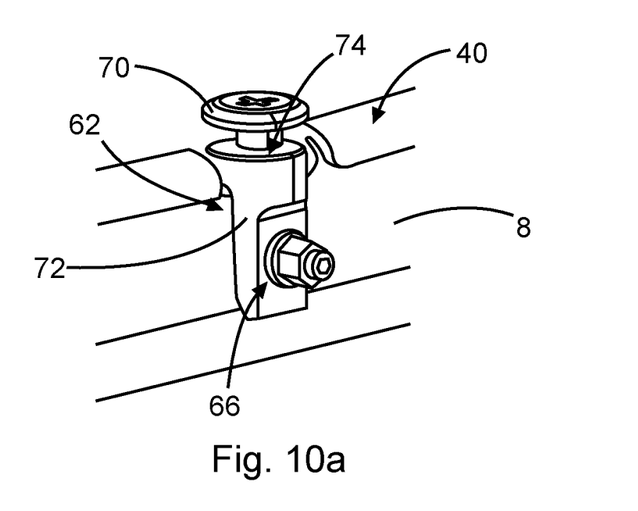
FIGS. 10a to 10c show details of a further centering means.
Figure 10B:
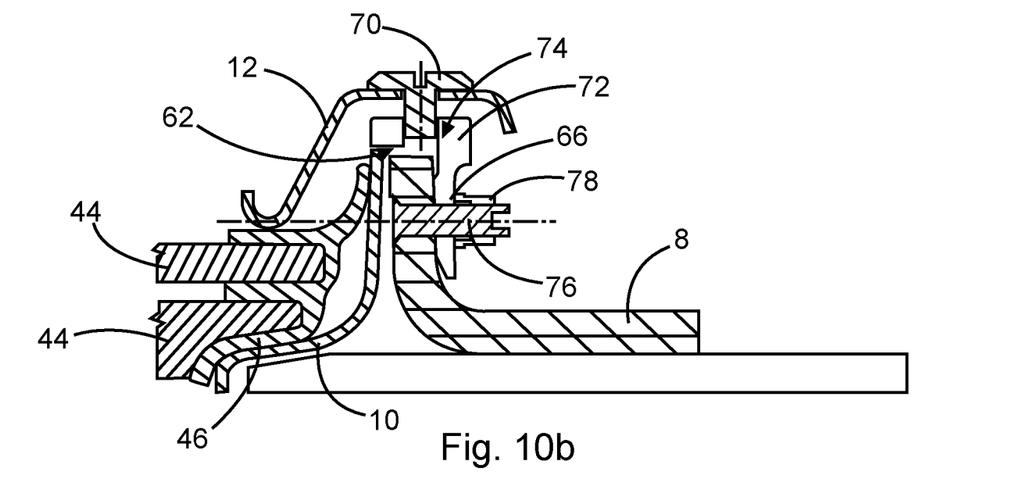
Figure 10C:
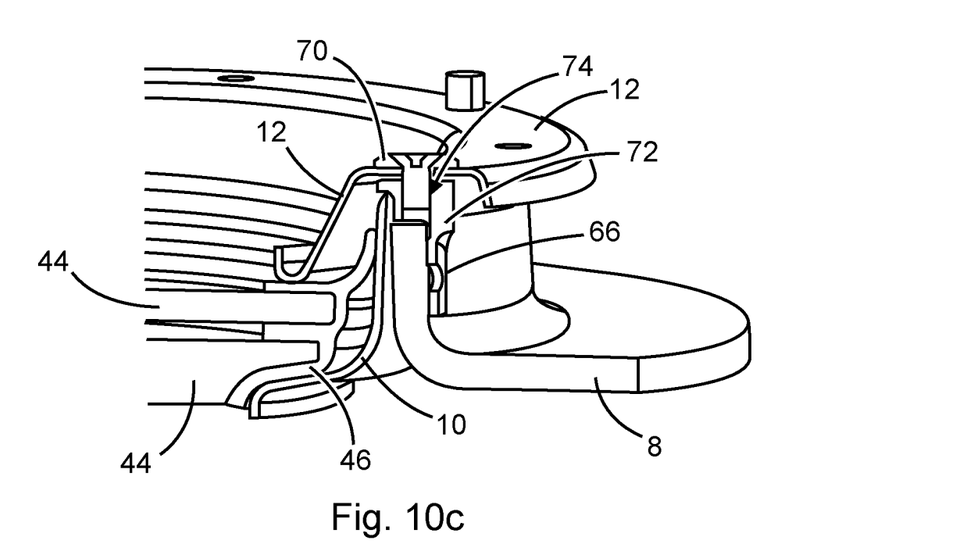

In FIGS. 10a to 10c, however, a second embodiment of a screwing means 70 and a centering means 72 are shown which are configured differently from the screwing means 52 and the centering means 54. The centering means 72 has, instead of an elongated receiving thread 68, an internal thread 74 into which the screw means 70 can be screwed, which is configured like a screw. The centering means 72 also has a through hole 66 through which a locking screw 76 projects, which is secured by a nut 78. However, this can also be realized by means of a riveted connection.

Figure 11:
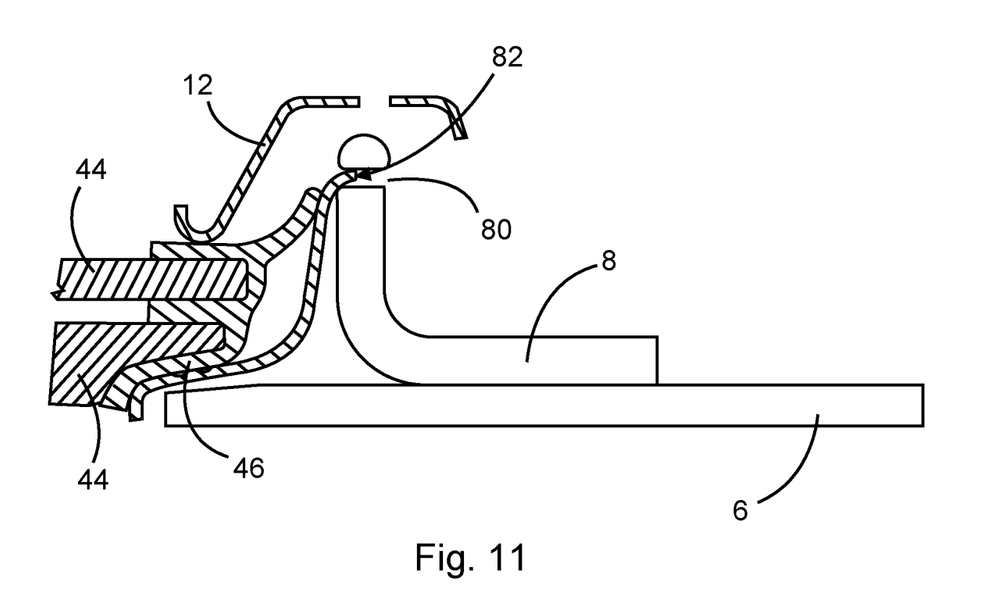
FIG. 11 shows a click connection between the inner retaining frame component and the stiffening frame component.

FIG. 11 shows a radial cutout 80 in the stiffening frame component 8, into which corresponding projection 82 on the inner retaining frame component 10 is engageable. The inner retaining frame component 10 may have such projections 82 at a plurality of locations, which are engageable with correspondingly arranged cut-outs 80. By this means, a fastening can be achieved.

Supplementally, it should be noted that "comprising" does not exclude other elements or steps, and "a" or "one" does not exclude a plurality. It should further be noted that features described with reference to any of the above embodiments may also be used in combination with other features of other embodiments described above. Reference signs in the claims are not to be regarded as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

2 Window frame
4 Window opening
6 Vehicle body
8 Stiffening frame component
10 Inner retaining frame component
12 Outer retaining frame component
14 Inner flange
16 End edge
18 Support portion
20 Radial outer end
22 Arc
24 Connecting portion
26 Edge surface
28 Projection
30 Exterior
32 Sealing material
34 Coupling portion
36 Recess
38 Parallel sections
40 Edge
42 Windows
44 Windowpane
46 Window seal
48 Cavity
49 Inside of the vehicle body
50 Quantity of material (removed)
52 First screw means
54 Second screw means
56 Conventional window frame
58 Recess
60 Recess
62 Shoulder
64 Tab
66 Through hole
68 Receiving thread
70 First screw means
72 Second screw means
74 Female thread
76 Locking screw
78 Nut
w Wall thickness

The invention claimed is:

1. A window frame for a vehicle, comprising:
a stiffening frame component, and
an inner retaining frame component couplable to the stiffening frame component for receiving at least a section of a window,
wherein the stiffening frame component has a profile with a support portion and an inner flange extending perpendicularly thereto,
wherein the inner flange forms an inner edge of the stiffening frame component and the support portion forms a support surface extending radially outwardly from the inner edge for resting on an edge surface of a window opening, wherein the inner retaining frame component comprises a profile having a coupling portion and a connecting portion, wherein the coupling portion is adapted to be fitted onto the inner flange of the stiffening frame component, wherein the connecting portion forms a surface for overlapping with the edge surface of the window opening and has at a radially inner boundary a projection facing away from the coupling portion and the support portion for surrounding the window opening at its radially inner side, wherein the coupling portion has a recess, and wherein a profile of the inner flange has at least one outwardly extending rectilinear portion insertable into the recess, and wherein the inner flange is configured to adapt the window frame to a predetermined configuration.

2. The window frame according to claim 1, wherein the recess is formed as a space between two sections of a flanged edge of the inner retaining frame component extending parallel to each other.

3. The window frame according to claim 1, wherein the recess has an open end and a closed end, the open end comprising a rounded cross-section.

4. The window frame according to claim 1, wherein the inner flange is cuttable to a predetermined dimension for each window frame.

5. The window frame according to claim 1, wherein the stiffening frame component has an L- or J-shaped profile cross-section.

6. The window frame according to claim 1, wherein a cavity facing away from the coupling portion is formed between the stiffening frame component and the inner retaining frame component.

7. The window frame according to claim 1, wherein the support portion of the stiffening frame component and the projection of the inner retaining frame component comprise an offset formed transversely of the support portion.

8. The window frame according to claim 1, further comprising an outer retaining frame component disposed on the inner retaining frame component and adapted to press a window disposed on the inner retaining frame component onto the inner retaining frame component from a side opposite to the inner retaining frame component.

9. The window frame according to claim 1, wherein the stiffening frame component and the inner retaining frame component are formed of a fiber reinforced plastic.

10. The window frame according to claim 9, wherein the fiber-reinforced plastic comprises a thermoplastic matrix.

11. The window frame according to claim 1, further comprising at least one centering means attachable to the stiffening frame component and adapted to align the inner retaining frame component with the stiffening frame component.

12. The window frame according to claim 11, wherein the at least one centering means is configured to align the outer retaining frame component with the stiffening frame component and/or the inner retaining frame component.

13. The window frame according to claim 11, wherein the stiffening frame component has at least one recess for receiving a shoulder of the at least one centering means.

14. An aircraft comprising a fuselage with at least one window opening and at least one window frame according to claim 1.

* * * * *